Nov. 8, 1932.  K. SCHOENE  1,886,840
VALVE
Filed Dec. 27, 1928   2 Sheets-Sheet 1

Fig. 1

Inventor
Kurt Schoene
By Dorsey and Ims
Attorneys

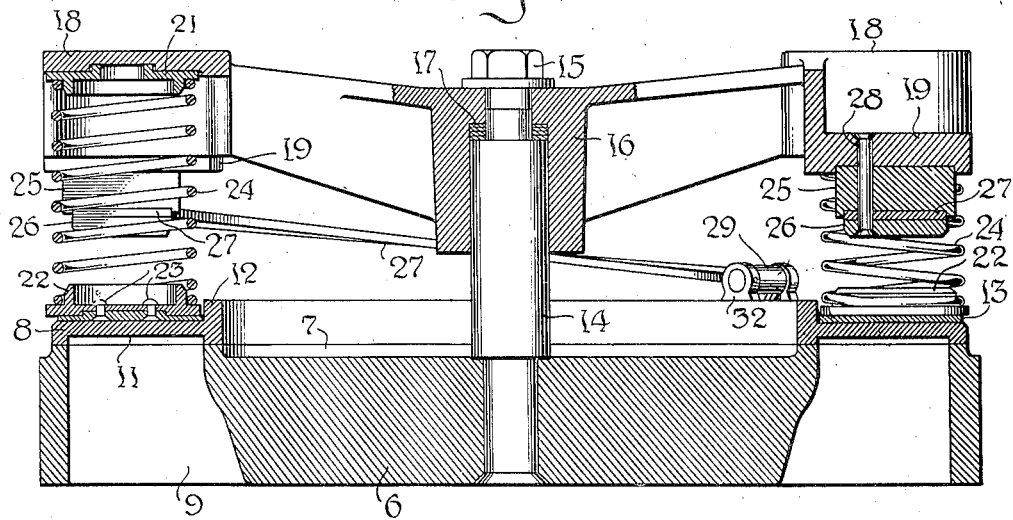

Patented Nov. 8, 1932

1,886,840

UNITED STATES PATENT OFFICE

KURT SCHOENE, OF HAMBURG, GERMANY

VALVE

Application filed December 27, 1928. Serial No. 328,795.

This invention relates to lift valves of the annular type, and while of general applicability, offers peculiar advantages in sewage pumps.

The principal objects of the invention are to simplify the structure, minimize the tendency of solids and trash to accumulate on the moving parts of the valve and interfere with its action, and to reduce the overall height of the valve structure.

The invention is an improvement on the valve described and claimed in German Patent 410,084. According to the German patent the annular valve was provided with an annular groove or trough into which extended the free ends of flexible guide blades supported on an overlying spider. This structure is entirely satisfactory for pumping clean water, but is objectionable in other cases because trash and solids will accumulate in the trough and prevent proper action of the valve.

According to the present invention there is a combined thrust and guide ring which is centered on the valve member by means of an annular flange. This produces a simple flat structure on which solids will not accumulate. It also leaves the valve free to rotate relatively to the thrust and guide ring. The guide ring is controlled by flexible blades, as in the case of the German patent, but these blades have a definite pivotal connection with the guide and thrust ring, and this pivotal connection is such as to permit lateral rocking of the guide blades relatively to the ring, a feature which prevents cramping, and insures free action of the valve at all times.

The guide blades are not relied upon to seat the valve, this being effected by coil springs, of which there is preferably one positioned adjacent the point of connection of each guide blade with the guide and thrust ring.

A preferred embodiment of the invention is illustrated in the accompanying drawings, in which,—

Fig. 1 is a plan view with parts broken away.

Fig. 2 is a vertical section on the line 2—2 of Fig. 1.

Fig. 3 is a section on the line 3—3 of Fig. 1, drawn on an enlarged scale.

Fig. 4 is a plan view of the connecting structure shown in Fig. 3.

6 represents a seat casting formed on its upper face with an annular boss 7 which is faced to form the valve seat. With this seat there coacts an annular valve 8 which controls ports 9 formed through the casting 6 and terminating in the valve seat. The valve 8 is channeled on its lower face, as indicated at 11, for reasons familiar to those skilled in the art, and is provided at its inner periphery with an upstanding flange 12 which serves to center a combined guide and thrust ring 13. Some clearance is allowed between the ring 13 and flange 12 to permit free relative movement, but the valve is effectively centered and positioned by the ring 13.

The exact construction of the ring 13 and of the valve 8 with its flange 12 is not material to the invention, so long as the parts be so formed that the member 13 centers the valve 8 and permits the latter to rotate relatively to the member 13. An upright post 14 is fixedly mounted in the casting 6 in any suitable manner, and its axis is concentric with the annular series of ports 9 and consequently with the valve 8. Retained on its upper end by nut 15 is a spider 16 here shown as having three arms, though obviously a greater number may be used in the case of large valves.

The adjustment of the vertical height of the spider 16 is secured by the use of shims 17. Each arm of the spider terminates in a pad 18 overying the ring 13 and spaced a suitable distance above the same. Projecting laterally from each pad 18 and overlying the ring 13 is an extension 19. Seated in the under face of each pad 18 is an annular spring seat 21 which is centered in a suitable recess formed in the lower face of the pad. A similar spring seat 22 is permanently fixed on the ring 13 by means of rivets 23. A coil compression spring 24 is confined between each pair of spring seats 21 and 22 and is the means for forcing the ring 13 and the valve 8 downward in seating direction.

Supported in a channel on the lower face of each extension 19 is an assembly made up of two blocks 25 and 26 and a guide blade 27. The guide blade 27 is arcuate in form and one end is clamped between the blocks 25 and 26, the blocks with the intervening end of the blade 27 being permanently attached to the extension 19 by means of two rivets 28. There are, of course, three of the arcuate blades 27, one for each of the pads 18 and these blades overlie the combined guide and thrust plate 13. The free end of each blade 27 is connected with the ring 13 by means of a sleeve or eye 29 which is riveted to the end of the corresponding blade 27 and which encircles a pin 31 supported at its ends in a bracket 32. Each bracket 32 it riveted, as indicated at 33, to the ring 13. The pins 31 are preferably of the special construction illustrated, that is the part within the sleeve 29 is bowed or tapered toward each end so as to have a barrel formation. It thus fits the sleeve 29 only at the middle and allows the sleeve 29 and the connected blade 27 to rock laterally relatively to the ring 13. This action is further facilitated by beveling the ends of the sleeve 29 to offer clearance, as indicated at 34.

The reason for adopting this construction is to avoid transmitting to the ring 13 any torsional stresses set up in the blades 27 as the latter are flexed up and down. In effect the pivot allows universal motion within the limits of flexure encountered in service.

A convenient mode of retaining the pins 31 in place is to provide each pin with a head 35 at one end and to fix it in place by a pin 36 passed through the other end and a portion of the bracket 32.

It will be observed that the guide blades 27 and the seating springs 24 correspond in number to the arms on the bracket 16, and that each guide blade 27 extends from one arm of the spider to a point on the ring 13 adjacent the spring 24 which is sustained by the next arm of the spider. It follows therefore that each blade 27 is given a maximum attainable length and exerts its guiding influence on the ring 13 very close to a corresponding one of the springs 24. It will also be observed that each guide blade 27 is supported below the spider 16 so that when the valve opens wide the blade 27 will be flexed upwardly as contradistinguished from the downward flexure which occurs when the valve is closed. Consequently the blades are in their neutral or unflexed condition when the valve is partially open. The effect of this is to reduce the degree of flexure of the blades 27 for a given lift of the valve.

Particularly for the class of service indicated the valve above described is a marked improvement over that disclosed in the German patent specified, because the tendency of trash to accumulate on the valve is minimized. The blades 27 are pivoted to the guide and thrust ring instead of being in sliding engagement with the valve, and the valve is free to move relatively to the guide and thrust ring so that it may accommodate itself to its seat.

Various changes in the details of construction can be made without departing from the spirit of the invention, and while I prefer the specific construction illustrated, the invention is not strictly limited to this.

What is claimed is,—

1. The combination of a valve seat; a spider mounted above the same; a plurality of guide blades each supported at one end on the spider; an annular thrust and guide member; hinged connections between each of said blades and said member; an annular valve rotatably mounted on said member and interposed between the member and said seat; and springs reacting between said spider and said annular thrust member.

2. The combination of a valve seat; a spider mounted above the same; a plurality of resilient guide blades each supported fixedly at one end of the spider; an annular thrust and guide member; universal hinge connections between each of said blades and said member; and an annular valve rotatably mounted on said member and interposed between the member and said seat.

3. The combination of a valve seat; a spider mounted above the same; a plurality of resilient guide blades each supported fixedly at one end on the spider; an annular thrust and guide member; hinge connections between each of said blades and said member; and an annular valve rotatably mounted on said member and interposed between the member and said seat.

4. The combination of a valve seat; a spider mounted above the same; a plurality of resilient guide blades each supported fixedly at one end on the spider; an annular thrust and guide member; hinge connections between the other end of each of said blades and said member; and an annular valve, rotatably mounted on said member and interposed between the member and said seat, the location of the fixed support of the blades being such that the latter are flexed in alternately reverse direction as the valve moves between closed and wide open positions.

5. The combination of an annular valve seat; an annular valve coacting therewith;

an annular guide and thrust member arranged to center said valve and to permit rotation of the valve relatively to the member; supporting means overlying said annular guide and thrust member; and a plurality of resilient guide blades each connected at opposite ends respectively with said overlying support and said annular member, one of said connections for each blade being rigid and the other hinged.

In testimony whereof I have signed my name to this specification.

KURT SCHOENE.